J. F. GILLESPIE & A. COLBERT
WELDING DEVICE.
APPLICATION FILED DEC. 26, 1911.
1,048,148.
Patented Dec. 24, 1912.
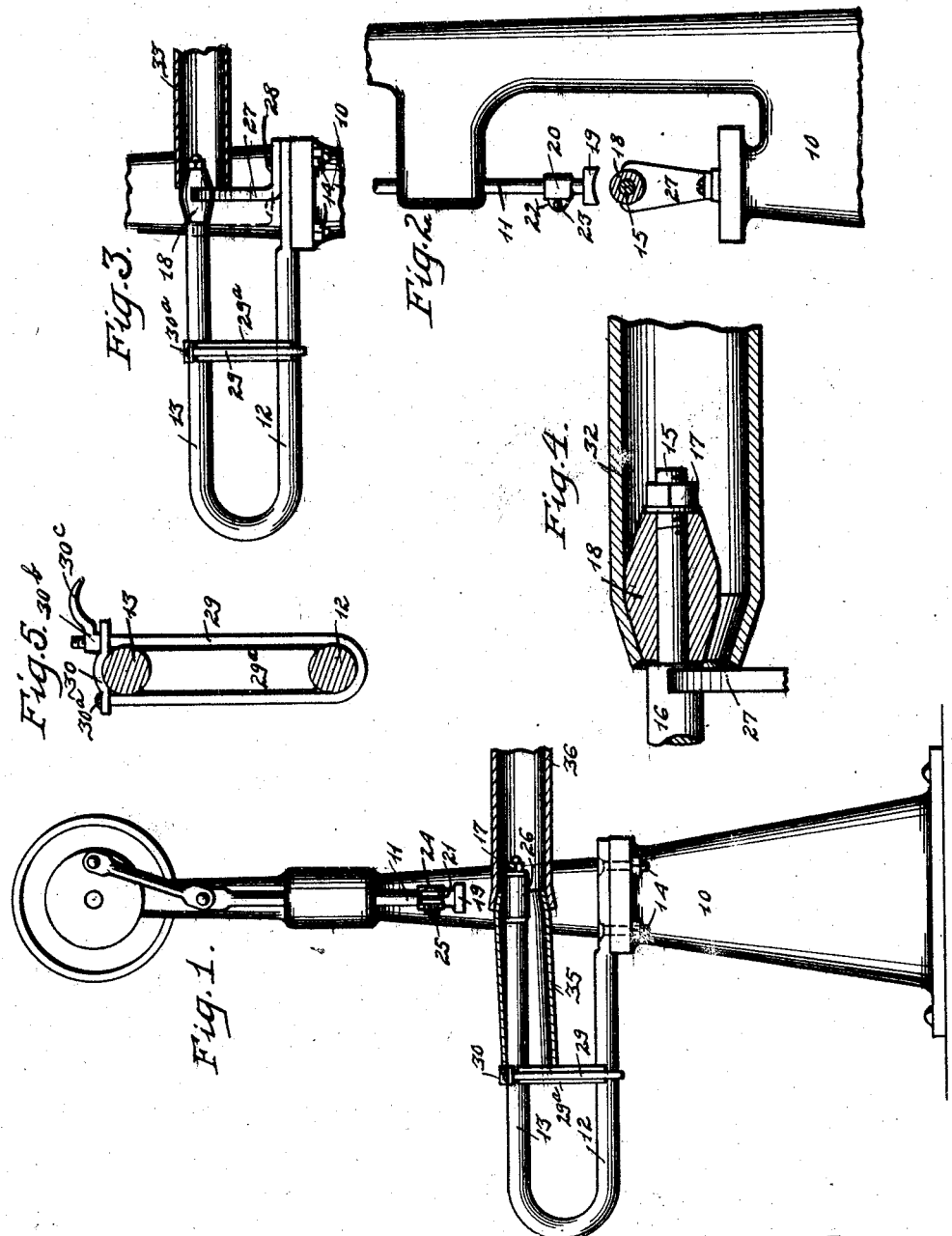

UNITED STATES PATENT OFFICE.

JAMES F. GILLESPIE AND ARTHUR COLBERT, OF DES MOINES, IOWA.

WELDING DEVICE.

1,048,148.  Specification of Letters Patent.  Patented Dec. 24, 1912.

Application filed December 26, 1911. Serial No. 667,992.

*To all whom it may concern:*

Be it known that we, JAMES F. GILLESPIE and ARTHUR COLBERT, citizens of the United States, residing at Des Moines, county of Polk, and State of Iowa, have invented a certain new and useful Welding Device, of which the following is a specification.

The object of our invention is to provide a device of simple, durable and inexpensive construction for welding together sections of pipe.

A further object is to provide such a device, whereby the end of one section of pipe may be flared outwardly and the end of another section of pipe contracted so that the end of the second section may be inserted in the end of the first section for welding and to provide means whereby said ends may be easily and quickly welded together.

A further object is to provide a welding device having adjustable means whereby the position of one or two sections of pipe may be varied with relation to the position of a hammer as desired.

A further object is to provide a welding device which leaves a smooth surface on the inside of the welded pipe.

A further object is to provide such a device which is adapted for use with an ordinary riveting machine.

Our invention consists in certain details, in the construction, arrangement and combination of the various parts of the device, whereby the objects contemplated are attained, as hereinafter more fully set forth, pointed out in our claims and illustrated in the accompanying drawings, in which:

Figure 1 shows a side elevation of an ordinary riveting machine with a welding device installed thereon embodying our invention. Fig. 2 shows an end elevation of the same. Fig. 3 shows a detail view of our improved welding device showing the position of a section of pipe in position for flaring the end thereof. Fig. 4 shows a detail, sectional view of a part of our device showing a section of pipe in position for contracting the end thereof, and Fig. 5 shows a detail, sectional view of a portion of our device showing the means for limiting the distance which the upper arm of our device may be inserted into a section of pipe.

In the accompanying drawings, we have used the reference numeral 10 to indicate the base or supporting frame of an ordinary riveting machine upon which is the striking arm 11. The riveting machine is of ordinary construction and we shall not further describe it.

Our improved welding device consists of a U-shaped device having lower and upper arms 12 and 13. The free end of the lower arm 12 is designed to be secured in any suitable way to the base 10. In the drawings, we have shown the arm 12 secured to the base 10 by means of the bolts 14. The free end of the upper arm 13 is provided with a small cylindrical extension 15. The end of the arm 13, at the point where the extension 15 begins, forms a shoulder 16. The free end of the extension 15 is screw threaded and a nut 17 may be mounted on said screw threaded end. For flaring the end of a section of pipe, or for contracting the end of a pipe section we provide a mandrel 18 which is provided with a central longitudinal opening. The mandrel 18 is mounted on the arm 13 by inserting the extension 15 into the opening in said mandrel, and is secured in position by screwing the nut 17 against the end of the mandrel. The outer surface of the mandrel 18 is tapered from its middle circumference toward either end, as clearly shown in Fig. 4.

We provide a hammer of special construction forming part of our device comprising a striking portion 19, the lower or striking surface of which is incurved from side to side to approximately fit a section of pipe. Above the striking portion 19 is an extension 20 having a vertical, central opening designed to receive the striking arm 11 of the riveting machine. The extension 20 is provided with a longitudinal slot 21 extending from its upper end to the bottom of the vertical opening therein and from said vertical opening to the outer surface of the extension 20. The extension 20 is provided with laterally extending flanges 22 on each side of the slot 21. In the flanges 22 are registering openings 23 in which is placed a bolt 24 on which is a nut 25. The hammer is secured to the striking arm 11 by inserting the end of said striking arm into the vertical opening in the extension 20 and by screwing the nut 25 tightly on the bolt 24, thus drawing together the flanges 22.

For use in welding together two sections of pipe after an end of one section has been flared and an end of the other section has been contracted, we provide a mandrel 26 which is cylindrical in form and is provided with a central longitudinal opening designed to receive the extension 15. For regulating the distance which the mandrel 18 may be inserted into the pipe, we provide a detachable bracket 27 which may be secured to the arm 12 by means of the bolt 28. The upper end of the bracket 27 is forked, as shown in Fig. 2, and the arms of the fork receive the mandrel 18 and are in sufficient proximity thereto to prevent the passing of the end of a section of pipe past said bracket 27.

When the hammer strikes on the free end of the arm 13, it is desirable to have that arm braced as firmly as possible. For this purpose and also for limiting the distance which the arm 13 may be inserted into a pipe we have provided the following means: A U-shaped brace 29 is designed to be inserted in the arm 12 with its sides extending upwardly and to receive between them the arm 13. Secured to the upper ends of the arms of the brace 29 is a cross piece 30 which is detachable and may be mounted on the brace 29 in any suitable way. As shown in the drawings, the cross piece 30 is slidably mounted on one of the arms of the brace 29 and is held thereon by means of a head 30$^a$ on said arm. The other end of the cross piece 30 is slidably mounted on the other arm of the brace 29, which arm is screw threaded at its end. A nut 30$^b$ having a handle 30$^c$ is placed on said screw threaded end. Between the arms 12 and 13 and between the two sides or arms of the brace 29 is a block 29$^a$, the ends of which may be slightly grooved to receive the sides or arms of the brace 29. The block 29$^a$ holds the arms 12 and 13 apart and supports the arm 13 during the operations of the hammer. The brace 29 and the block 29$^a$ may be adjusted longitudinally on the arms 12 and 13 so as to support the arm 13. When the ends of sections of pipe are being flared or contracted the brace 29 and block 29$^a$ may be secured near the free ends of the arms 12 and 13. When the sections of pipe are being welded the brace 29 and the block 29$^a$ may be secured in proper positions to hold the point of the weld over the mandrel.

In the practical operation of our improved welding device, we install the U-shaped device on a riveting machine by securing the arm 12 to the platform 10. We then place the mandrel 18 on the extension 15 and secure it in position by means of the nut 17. The mandrel 18 is designed to turn or rotate freely on the extension 15 between the shoulder thereon and the nut 17. The striking arm 11 is inserted into the vertical opening in the extension 20 of the hammer and said extension is fastened securely on the striking arm 11 by screwing the nut 25 tightly on the bolt 24 and drawing the flanges 22 together. Our device is then in position for use for contracting or flaring the end of a section of pipe. If it is desired to contract the end of a pipe section the bracket 27 is inserted in position so that a section of pipe can be placed on the mandrel 18 with its end extending past the middle thereof, as shown in Fig. 4. The bolts 14 are designed to fit in a slot in the support 10 so that the arms 12 and 13 may be adjusted in such a way as to cause the hammer to strike in the middle of the mandrel or on either side of the middle. In contracting the end of the pipe the U-shaped device is so adjusted that the hammer strikes the pipe section which, in Fig. 4, is indicated by the reference numeral 32 at a point over the contracted inner end of the mandrel 18. The end of the pipe section 32 will thus be contracted around the tapered end of said mandrel, as shown in said figure. When it is desired to expand or flare the end of a section of pipe the bracket 27 is adjusted to permit the end of a section of pipe to be placed on the mandrel to about the middle thereof, as shown in Fig. 3, where the pipe section is indicated by the reference numeral 33. The U-shaped device is adjusted by means of the bolts 14 until the hammer strikes the pipe 33 at a point just to the right of the middle of the mandrel 18, as shown in Fig. 3. When the hammer is operated the end of the pipe resting against the tapered end of the mandrel will be flared outwardly.

In welding together two sections of pipe we flare the end of one section and contract the end of another section. We then remove the mandrel 18 and place the mandrel 26 on the extension 15. The second section of pipe is placed on the arm 13 as shown in Fig. 1, with the contracted end of one section of pipe received within the flared end of the other section, and the device 29 is set in proper position to hold the ends of the pipe which are to be welded under the hammer. The contracted end of one pipe section is inserted into the expanded or flared end of the other section, as shown in Fig. 1, where the pipe sections are indicated by the reference numerals 35 and 36, the two ends being placed so that they surround the mandrel 26. In preparing the ends for welding and in welding them the hammer is operated and the pipe sections are slowly rotated causing each portion of the circumference of their ends to be struck by the hammer. It will be understood that the ends of the pipe section are heated to the proper degree for bending and for welding. When the pipe sections are properly heated and placed in the position shown in Fig. 1, and are rotated on the arm 13 under repeated blows of the hammer their adjacent ends are thoroughly welded together. On account of the use of the mandrel 26 with its smooth outer surface the inner surface of the pipe at the point of the weld is kept smooth.

Our improved welding device has a number of advantages among which is the fact that it is adapted to be used with an ordinary riveting machine. The use of the mandrel 18 with our U-shaped device enables us very rapidly and easily to flare and contract the ends of respective pipe sections for welding them together. When sections of pipe are welded together by hand a ridge is left on the inside of the welded pipe at the point of the weld, which ridge interferes with the cleaning of the pipes when they are used in boilers or the like. By the use of our mandrel 26 the welded pipe is given a smooth inner surface which permits the easy cleaning of the pipe after the operation of welding has been completed. The use of the device 29 permits us to weld two sections of pipe at any exact point which is a difficult operation when welding is done by hand. Our hammer is of special construction peculiarly adapted to be used with our U-shaped device and mandrels and with an ordinary riveting machine.

We claim as our invention:

1. In a device of the class described, a substantially U-shaped device, one end of which is designed to be adjustably secured to a base, the other end of which is provided with a shoulder a cylindrical longitudinal extension, screwthreaded at its end, a nut on said screwthreaded end, and a mandrel rotatably mounted on said extension between said shoulder and said nut.

2. In a device of the class described, a substantially U-shaped device, means for adjustably securing one end thereof to a base, a shoulder on the other end thereof, a cylindrical portion extending from said shoulder in line with said last named end, a substantially cylindrical portion extending from said shoulder in line with said last named end, a substantially cylindrical mandrel rotatably mounted on said portion, and adjustable means on said U-shaped device for limiting the distance which said mandrel may be inserted into a pipe.

3. In a device of the class described, a substantially U-shaped device having an upper and a lower arm which stand in a vertical plane spaced from each other, means for adjustably securing the lower arm to a support, means for mounting a mandrel on the upper arm and means whereby said upper arm is supported at a certain distance above said lower arm, which means is adjustable longitudinally on said U-shaped device and serves to limit the distance which the upper arm may be inserted into a pipe.

4. In a device of the class described, the combination of a U-shaped device having one end designed to be secured to a base, a shoulder and a cylindrical extension on the other end of said device, a substantially cylindrical mandrel detachably mounted on said extension, and adjustable means on said U-shaped device for limiting the distance said last named end may be inserted into a pipe, and means adjustable longitudinally on said U-shaped device for holding the arms thereof at a fixed distance from each other.

Des Moines, Iowa, October 26, 1911.
JAMES F. GILLESPIE.
ARTHUR COLBERT.

Witnesses:
VINCENT HOGAN,
MARY O'BRIEN.

Copies of this patent may be obtained for five cents each, by addressing the "Commissioner of Patents, Washington, D. C."